Patented Oct. 30, 1928.

1,689,902

UNITED STATES PATENT OFFICE.

JOHN F. WILLIAMS, OF BUFFALO, NEW YORK, ASSIGNOR OF ONE-THIRD TO CARROLL J. ROBERTS AND ONE-FIFTEENTH TO LUCIAN C. JACKSON, BOTH OF BUFFALO, NEW YORK.

FORMULA FOR TEST REAGENTS TO DETERMINE THE ALCOHOL AND THE COLOR IN ALCOHOLIC LIQUIDS.

No Drawing.   Application filed August 2, 1926.   Serial No. 126,738.

This invention relates to formulas for test reagents which will determine the percentage of alcohol in alcoholic liquids, as in fermented and distilled spirits and in the hydroxides of organic radicals, and at the same time determine the natural and artificial color in the same, as for instance in whisky.

My main object is to furnish a test reagent that requires no especial skill in manipulation but at the same time can be used to get an easily understood, a rapid and a reliable determination of the alcoholic content in alcoholic liquids and also at the same time to determine its natural and its artificial color.

Another object is to furnish a test reagent which together with a small graduated cylinder forms a complete testing outfit for use while away from a chemical laboratory and which can be carried in the vest pocket.

Another object is to furnish a test reagent which can be quickly applied by a physician or a druggist when he needs a test for the "proof" and purity of medical spirits, or by an individual who has obtained alcoholic liquids on a prescription.

Another object is to furnish a test reagent which can be used for a quick test where denatured alcohol is used in the industries; where public inspectors and chemists make preliminary investigations; and where a quick test is desired at court to check previously obtained analytical results.

With these objects in view, the invention consists in a certain novel combination and proportion of ingredients by which the said objects and certain other objects which will hereinafter appear are attained, the invention being more particularly pointed out in the claims.

It is not intended that this reagent together with the apparatus and method of applying it, (which said apparatus and method are the subject of a co-pending application for patent and to which reference is made) will be a complete substitute or can entirely take the place of the regular laboratory methods where it is desirable to know the percentage of alcohol in small fractions of one per-cent. Rather it furnishes a quick check for the laboratory method and a sufficiently accurate means for the purposes indicated. This accuracy depending somewhat on the skill in handling and reading the results obtained by the operator, quite accurate and consistent results can be obtained.

The present standard method of testing distilled liquors in the laboratory for the percentage of alcohol includes a process of distillation and consumes an hour or considerably more in time by a trained chemist. The color test is then a separate operation by using 20 cc. of a Marsh reagent to 25 cc. of a solution which is made up from a sample which has been evaporated and then dissolved in water and alcohol added. The Marsh reagent is composed of 100 cc. of pure amyl alcohol, 3 cc. of sirupy phosphoric acid and 3 cc. of water.

These present standard tests are obtained from "Methods of Analysis of the Association of Official Agricultural Chemists, second edition, revised to July 1, 1924."

The ingredients of my reagent are refined fusel oil, toluene and a 50% aqueous solution of tartaric acid. These are measured out separately and then thoroughly mixed in the following proportions:

70 parts refined fusel oil (or amyl alcohol), 28 parts toluene (or toluol), 2 parts 50% aqueous solution of tartaric acid.

This reagent has a specific gravity of $$.8333 \left( \frac{20°}{4°} C. \right).$$

The fusel oil should preferably be refined and the boiling point be between 120° and 130° C. with a specific gravity of .8106.

The ingredients used need not exactly conform to these figures however, as other grades of fusel oil have been tried and were found to be suitable when used in the reagent and applied to a 50% alcoholic solution. The physical properties of two different grades of fusel oil which gave satisfactory results were as follows:

1. Boiling range 110°–130°, sp. gr. $.8119\left(\frac{20}{4}\underline{C.}\right)$;

and

2. Boiling range 127°–129°, sp. gr. $.8103\left(\frac{20}{4}\underline{C.}\right)$.

The boiling point of the toluene is preferably 110°–111° C.

The action of the fusel oil is to extract the alcohol and take it up together with the "natural" color while the toluene prevents the fusel oil from retaining some water and separates and expels it from the reagent. The tartaric acid renders the reagent acid and acts to prevent the formation of emulsions and also causes a clear separation of the natural and artifical colors into separate layers. The artificial or caramel color being soluble in water remains in the lower layer or residuum. A mixture without the acid will get results if carefully handled.

It is not intended to limit the formula to the use of the exact ingredients specified as ingredients which are closely related or which will give similar results may be used and still be within the scope of this invention, as for instance I have found that zylene (or zylol) can be used as it is very closely related to toluol and give similar results.

It is not necessary to use tartaric acid as acetic acid can be used or any acid soluble in the fusel oil and toluene mixture.

This reagent or oil test has been used to test pure and denatured alcohol, whisky, brandy, gin, etc., and gives results in agreement with those obtained by using a U. S. standard hydrometer and at the same time determines the presence of natural or artificial coloring matter or caramel.

The action of the reagent on an alcoholic liquid, as whisky and called the sample, when properly used therewith (as described in the process in the co-pending patent application referred to above) is to extract the alcohol which goes into the reagent, leaving a residuum liquid, whose volume, being measured offers an index for obtaining the percentage of alcohol in the sample.

At the same time so-called "natural" coloring matter in whisky (obtained from storage in charred oaken barrels, etc.) is also extracted and goes into the reagent, while certain added or artificial coloring matter in the sample, such as caramel, remains in the aqueous or lower layer which is the residuum.

Having thus described my invention, I claim:

1. A reagent for the purpose set forth, consisting essentially of fusel oil, toluene and tartaric acid.

2. A reagent for the purpose set forth, consisting essentially of an acidified mixture of fusel oil and toluene.

3. A reagent for the purpose set forth, consisting of fusel oil of about 70 parts, toluene 28 parts and an aqueous solution of tartaric acid 2 parts, all by volume.

4. In an oil test reagent, the combination of fusel oil, a hydrocarbon of the aromatic series and an acid, whereby the alcohol content of an alcoholic liquid may be determined.

5. In a test reagent, the combination of fusel oil, a hydrocarbon of the armomatic series and tartaric acid, whereby the natural and artificial color of an alcoholic liquid may be determined.

6. In a test reagent for alcoholic liquids, the combination, of an amyl alcohol and a hydrocarbon of the aromatic series in an acidified mixture, whereby the alcohol content and the coloring matter in said liquids may both be determined.

7. A test reagent for alcoholic liquids for the purpose set forth, including toluene and an amyl alcohol for extracting the alcohol from said liquids.

8. A test reagent for alcoholic liquids for the purpose set forth, including an amyl alcohol and a hydrocarbon of the aromatic series.

9. A test reagent for alcoholic liquids for the purpose set forth, including an amyl alcohol for extracting the alcohol together with the natural coloring matter from said liquids and an acid for clearly separating and leaving the artificial coloring matter in the residuum.

10. A test reagent for alcoholic liquids, including a hydrocarbon of the aromatic series and fusel oil for extracting the alcohol from said liquids.

11. A test reagent for the purpose set forth, including fusel oil for extracting and taking up the alcohol from said liquid and toluene for expelling the water from said liquid.

12. A test reagent for alcoholic liquids, consisting of an acidified mixture containing an amyl alcohol and toluene.

In testimony whereof, I have signed my name to this specification.

JOHN F. WILLIAMS.